United States Patent [19]

Baldantoni et al.

[11] Patent Number: 5,418,072
[45] Date of Patent: May 23, 1995

[54] TOTALLY CONSUMABLE BRAZING ENCAPSULATE FOR USE IN JOINING ALUMINUM SURFACES

[75] Inventors: Antonio Baldantoni; Roland S. Timsit, both of Kingston, Canada

[73] Assignee: Alcan International Limited, Montreal, Canada

[21] Appl. No.: 124,159

[22] Filed: Sep. 20, 1993

[51] Int. Cl.$^6$ ............................................. B22F 7/04
[52] U.S. Cl. ................................ 428/558; 428/545; 428/548; 428/551; 428/552; 428/553; 428/554; 428/557; 428/564
[58] Field of Search ............... 428/545, 548, 551, 552, 428/553, 554, 557, 558, 564; 419/5, 8, 9, 23, 25, 38, 47, 46

[56] References Cited

U.S. PATENT DOCUMENTS

| | | | |
|---|---|---|---|
| 3,915,693 | 10/1975 | Rasmussen | 75/304 |
| 3,971,501 | 7/1976 | Cooke | 228/248 |
| 4,053,304 | 10/1977 | Tsuda | 73/327 |
| 4,214,145 | 7/1980 | Zvanut et al. | 219/145.22 |
| 4,800,131 | 1/1989 | Marshall et al. | 428/558 |
| 4,831,701 | 5/1989 | Yutaka | 29/157.3 |
| 4,994,640 | 2/1991 | Kiser | 219/145.22 |
| 5,100,048 | 3/1992 | Timsit | 229/198 |
| 5,176,205 | 1/1993 | Anthony | 165/133 |
| 5,190,596 | 3/1993 | Timsit | 148/23 |
| 5,232,788 | 8/1993 | Timsit | 428/560 |
| 5,316,863 | 5/1994 | Johnson | 428/548 |

FOREIGN PATENT DOCUMENTS

0552567A1  7/1993  European Pat. Off. .

Primary Examiner—Donald P. Walsh
Assistant Examiner—John N. Greaves
Attorney, Agent, or Firm—Cooper & Dunham

[57] ABSTRACT

A consumable brazing encapsulate is used for joining aluminum to metal surfaces, e.g. aluminum, copper, brass or steel surfaces, by brazing. The encapsulate comprises a mixture of particles of an eutectic forming metal selected from the group consisting of silicon, germanium, copper and zinc and particles of a brazing flux encapsulated in a layer or layers of aluminum or its alloys, said eutectic forming metal and flux being present in the following parts by weight per 100 parts by weight of the total aluminum in the encapsulate: (a) 7 to 15 parts of silicon and 7 to 45 parts of flux; (b) 25 to 120 parts of germanium and 100 to 250 parts of flux; (c) 40 to 70 parts of copper and 20 to 100 parts of flux; (d) 1300 to 2400 parts of zinc and 1000 to 2000 parts of flux; such that when the encapsulate is placed between aluminum surfaces to be joined and is heated, the eutectic forming metal and the encapsulating aluminum are totally converted in situ into an eutectic filler metal for joining the aluminum surfaces. It may also be in the form of a consumable brazing laminate in which the mixture of particles are bonded to an aluminum substrate by means of a binding agent.

31 Claims, 3 Drawing Sheets

TOTALLY CONSUMABLE BRAZING ENCAPSULATE FOR USE IN JOINING ALUMINUM SURFACES

BACKGROUND OF THE INVENTION

This invention relates to the joining of aluminum to metal surfaces by brazing and, more particularly, to a totally convertible brazing encapsulate or laminate for use in brazing aluminum to surfaces such as aluminum, copper, brass surfaces.

It is common practice to join aluminum components by disposing an aluminum brazing alloy between or adjacent the component surfaces to he joined, and heating the brazing alloy and the joining surfaces in appropriately assembled fashion to a temperature (brazing temperature) at which the brazing alloy melts while the components remain unmelted. Upon subsequent cooling the brazing alloy forms a filet or joint that bonds the joining surfaces of the components. For assured selective melting of only the brazing alloy in heating step, it is commonly preferred that the melting point of the brazing alloy be at least 30° to 40° C. lower than that of the metal of the components. An example of a typical aluminum brazing alloy is an aluminum-silicon eutectic composition, which starts to melt at about 577° C.

Chemical Abstract 193273 83-450066 refers to a Lucas-Milhaupt publication entitled "Designing for Preforms—Gold/Silver/Aluminum/Soft Solder/Copper". It describes flux-filled solder preforms, which may he used for brazing. There is no disclosure of a brazing laminate or encapsulate that is totally convertible to a eutectic alloy during brazing.

Kiser, U.S. Pat. No. 4,994,640 issued Feb. 19, 1991, discloses a welding electrode whose core is filled with flux. The electrode comprises a sheath made up of Ni and Mn, while the flux contains Mn, Si, Al, Ca and Mg. This electrode is used in welding, not brazing to make a weld pool of Ni and Mn. An eutectic alloy is not formed.

Zvanut et al, U.S. Pat. No. 4,214,145, issued Jul. 22, 1980, describes an electrode comprising a sheath of metal surrounding a hollow core filled with iron powder, along with manganese and silicon. This electrode is used in arc welding, not in brazing, and no eutectic alloy is generated when the electrode is heated.

Yutaka, U.S. Pat. No. 4,831,701, issued May 23, 1989, discloses a composition for brazing zinc metal or a zinc alloy to the surface of an aluminum workpiece. The metal is deposited by vacuum vapor deposition or by ion plating the metal onto the surface of a potassium fluoroaluminate flux. The flux is encapsulated by a metal or alloy and there is a reaction between the metal and the substrate upon heating. However, there is no reaction between the encapsulating metal and the material encapsulated to produce an alloy and the material that is encapsulated is an inorganic salt, a potassium fluoraluminate.

In U.S. Pat. No. 3,971,501 (Cooke) there is described a method of joining aluminum surfaces with an aluminum brazing alloy in which a mixture of the aluminum brazing alloy in powdered form and a powdered flux is coated on the surfaces to be joined. The coating is then dried and the surfaces are then heated to a brazing temperature whereby the brazing is completed. This procedure, like other known systems, utilizes a brazing alloy.

Although fluxless brazing procedures have been devised, their use is limited because of economic and other considerations arising from the special conditions and equipment required for successful practice of such procedures. It is, therefore, generally necessary to employ a flux in brazing aluminum, to remove the oxide ordinarily present on exposed metal surfaces at the location of the joint, as well as to promote flow of molten brazing alloy during the heating step. The material used as a flux must be capable of dissolving and/or otherwise removing the metal oxides at the brazing temperatures while remaining essentially inert with respect to the aluminum at such temperatures. Since fluxes are usually reactive only when at least partially molten, fluxes for aluminum brazing should as a practical matter be partly or wholly molten at brazing temperatures, e.g. at temperatures not substantially higher and preferably lower than 577° C.

It is the object of the present invention to provide a brazing encapsulate or laminate for use in joining aluminum surfaces which is capable of being totally consumed or converted during a brazing procedure.

It is another object of the present invention to provide a brazing procedure which does not require the application of brazing flux to the joint area.

SUMMARY OF THE INVENTION

According to the present invention, it has now been discovered that it is possible to produce a totally consumable brazing encapsulate for use in joining aluminum to metal surfaces. This encapsulate comprises a mixture of particles of one or more of the eutectic forming metal selected from the group consisting of silicon, germanium, copper and zinc and particles of a brazing flux encapsulated in a layer or layers of aluminum or alloys thereof. According to the invention, the eutectic forming metal and the flux are present in the following parts by weight per 100 parts by weight of the aluminum metal in the encapsulate: (a) 7 to 15 parts of silicon and 7 to 45 parts of flux; (b) 25 to 120 parts of germanium and 100 to 250 parts of flux; (c) 40 to 70 parts of copper and 20 to 100 parts of flux; (d) 1300 to 2400 parts of zinc and 70 to 2000 parts of flux. When this encapsulate is placed between the surfaces to be joined and is heated, the eutectic forming metal and the encapsulating aluminum are totally converted in situ into an eutectic filler metal for joining the aluminum to metal surfaces. The surfaces to be joined to aluminum may be selected from aluminum, copper, brass or steel surfaces.

The encapsulated particles may also include some aluminum or alloys thereof. For instance, aluminum powder may be mixed with the flux particles and the eutectic forming metal particles or the encapsulated particles may comprise a mixture of flux particles and particles of one or more hypereutectic alloys selected from the group consisting of Al-Si, Al-Ge, Al-Cu and Al-Zn. It is also possible to include both the hypereutectic alloy particles and the aluminum powder with the flux particles. Another encapsulated mixture containing aluminum is one comprising a mixture of particles of one or more aluminum alloys, particles of the eutectic forming metal or hypereutectic alloy and particles of flux. The aluminum alloys used in the encapsulate may contain alloying amounts of Cu, Mn, Zn, Fe and/or Si. When the encapsulated particles include aluminum or alloys thereof, the above ratios of eutectic forming metal and flux are based on 100 parts by weight of the total aluminum content of the encapsulate, i.e. the aluminum forming the encapsulating layer or layers and that contained in the encapsulated particles.

In the novel encapsulate, the flux is present in sufficient quantity so that upon heating the flux melts, consuming the aluminum oxide on the inner surface of the encapsulating aluminum layer or layers, as well as the oxide layer on the surface of the eutectic forming metal or metals and their hypereutectic alloys with aluminum metal. As a result, bare aluminum comes into contact with the particles of eutectic forming metal. This direct contact leads, at temperature equal to or exceeding the eutectic reaction temperature of the eutectic forming metal/aluminum system, to localized melting of the aluminum in the vicinity of each eutectic forming metal particle. This process continues until all of the metal particles and the encapsulating aluminum are consumed, leading to the formation in situ of a lower melting point eutectic filler metal. The excess molten flux spreads rapidly from the molten encapsulate over the aluminum surfaces to be joined, from which it removes the films of native surface oxide. This allows the filler metal to form a fillet around the joint and to bond the juxtapositioned surfaces. A brazed joint is formed when the heat is removed and the eutectic filler metal is allowed to solidify.

The principal advantage of the novel encapsulate of this invention is that a brazed joint can be achieved without the need to apply a separate brazing flux to the joint area. For example, the current practice for making brazed tube joints is to place wire preform made from an aluminum alloy of high silicon content on the joint area, then apply flux, usually in paste form, then apply heat to form the joint. With the present invention, it is simply a matter of placing the novel encapsulate onto the joint area and then heating the assembly to brazing temperature. This saves an operation on the brazing line and reduces waste of fluxing agent. In addition, it is in many instances possible to eliminate a post-braze cleaning operation since less flux residue is present.

The encapsulate according to the invention can be prepared in a wide variety of forms, such as a hollow aluminum wire with the particulate mixture forming the central core, a sandwich structure with the particulate mixture being held between aluminum cover sheets or foils, which can be made by conventional metal working processes such as rolling, forging, or stamping, or a hollow extrusion with aluminum surrounding a core consisting of the particulate mixture. This can be made by first extruding the aluminum, and then filling the space; or by co-extruding the aluminum and the brazing mixture. The encapsulates are easily made by known techniques and, for instance, the cored wire may be easily produced using the technique described in U.S. Pat. No. 4,214,145, issued Jul. 22, 1980 and incorporated herein by reference. When using the encapsulate of the invention for joining aluminum surfaces, the encapsulate is shaped into a preform which conforms to the surfaces to be joined and is then placed between the joining surfaces. The preform and the joining surfaces are then heated to a temperature above that at which the flux melts and the eutectic forming metal can react with the encapsulating metal to form eutectic alloy of the metals, but below the melting point of the metals to be joined, thereby totally converting the preform into a eutectic filler metal which runs into and wets the surfaces to be joined. The thus brazed assembly is allowed to cool to ambient temperature. For shaping of the encapsulate, the encapsulating aluminum layer is preferably quite ductile and may be commercially pure aluminum and also aluminum alloys such as AA1100, AA3003, AA3045, and AA1435, etc.

When the encapsulate is in the form of a cored wire, the shaping is done by simply cutting off suitable lengths of wire and bending them into a ring of the required diameter or other dimension and weight. In the case of a sandwich or laminate, the shapes are cut out or punched out from the laminate sheet, into the required dimensions, or can be formed into the desired shape, and optionally the center portions or portions may be punched out so that the preform can be accurately located on the surfaces being brazed.

The flux component of the encapsulated mixture may be any material capable of removing the oxide layer and which melts below 600° C. A preferred flux is a complex potassium fluoroaluminate. As herein used, potassium fluoroaluminate refers to materials containing the elements potassium, aluminum, and fluorine, in such proportions that compounds such as KF, $AlF_3$, $KAlF_4$, $K_2AlF_5$, $K_3AlF_6$ either singly, doubly or in combination are present. The composition can be expressed in terms of the elemental composition of 20 to 45% K; 10 to 25% Al, and 45 to 60% F; or in terms of the concentration of the compounds KF and $AlF_3$, as 40 to 70% $AlF_3$ and 30 to 70% KF. Such fluxes have been described among others in British Patent No. 1,055,914 to Societe Des Soudures Castolin S.A., published on Jan. 18, 1967 for a combination containing 53–55% $AlF_3$ and 45–47% KF; and in U.S. Pat. No. 3,951,328 issued on Apr. 20, 1976 and assigned to Alcan Research and Development Limited for a combination of 45–65% $AlF_3$ and 35 to 55% KF, which provides for a mixture of $K_3AlF_6$ and $KAlF_4$ to give a mixture which melts around 565° to 580° C.

Other potassium fluoroaluminates having the desired flux properties is a mixture of 65.6 to 99.9% $KAlF_4$ and 34.4 to 0.1% $K_3AlF_6$, and yet another is described in European Patent Publication EP 0295541 published on Dec. 21, 1988 in the name of Showa Aluminum Corporation for a mixture prepared from 31.5 to 56.2% KF and 68.5 to 43.8% $AlF_3$. Still another description is in U.S. Pat. No. 4,579,605 issued on Apr. 1, 1986 and assigned to Furukawa Aluminum Co. Ltd. for a flux comprising one member chosen from the group $K_2AlF_5$ and $K_2AlF_5.H_2O$, the remainder being KF.

One example of a commercially sold potassium fluoroaluminate is Nocolok® flux, other potassium fluoroaluminates such as $KAlF_4$, $K_2AlF_5$, $K_3AlF_6$, and their mixtures; and potassium fluoroaluminate mixed with one or more of cesium chloride, rubidium chloride, lithium fluoride, cesium fluoride and other alkali halide salts to reduce the melting point of the flux. Other known aluminum brazing fluxes are: mixture of alkali and alkaline earth chlorides and fluorides, ammonium chloride, ammonium fluoride, potassium acid fluoride ($KHF_2$), sodium acid fluoride ($NaHF_2$), ammonium acid fluoride ($NH_4HF_2$), zinc chloride, mixtures of zinc chloride, potassium acid fluoride and ammonium chloride and potassium fluoro-zirconate ($K_2ZrF_6$).

Yet another preferred flux is the flux disclosed in British Patent application GB 2,241,513A published on Sep. 4, 1991 (the disclosure of which is incorporated herein by reference). This flux comprises cesium fluoride, aluminum fluoride, and a crystalline aluminum hydroxide or aluminum oxide or both, which form a crystalline compound having the following composition and containing cesium in the form of a complex salt:

wherein $x+y+z=100$, $x/y \leq 3$, $42 \leq x \leq 66$, and $z \geq 2$ in terms of mol. %. The value of n is any suitable value for water of crystallization of $Al_2O_3$. This crystalline compound has a melting point of 440°–580° C. This flux is non-corrosive and safe to use.

The eutectic forming metal component of the encapsulated mixture and the flux are preferably in the form of fine particles, with the eutectic forming metal typically having particles in the size range of 4 to 150 μm, preferably 4 to 100 μm, with 50 to 100 μm being particularly preferred.

The nature of the brazing joint according to the present invention may be modified by including in the particulate mixture a portion of at least one other particulate material. Such other particulate material may be selected from the group consisting of Be, Cu, Fe, Mn, Ni, Zn, Bi, Sr, Cr, Sb and V. When a modifier is used it is preferably present in the ratio of modifier to eutectic forming metal in the range of $10^{-6}:1$ to $1:1$ on a weight/weight basis, depending on the element used and the effect sought.

According to another preferred embodiment, the powder mixture may also include a binder component. This binder may be selected from a variety of binder materials which are capable of volatilizing below the melting point of the flux and the eutectic alloy. Examples of suitable binder materials include a mixture polyethylmethylacrylate and butylacrylate or 1-(2-methoxy-1-methyloxy)-2-propanol and propylene glycol as the carrier, or 2-methyl-2, 4-pentanediol. A commercially available binder is sold under the trade mark NICROBRAZ by the Wall-Colmonoy Corp. The ratio of binder to eutectic forming metal is preferably in the range of 1:1 to 0.1:1 on a weight/weight basis.

When the binder is used, it is also possible to form the product as a laminate, in which an aluminum substrate is coated with the novel brazing composition of the invention held in place by the binder. Thus, when the binder is used, a covering foil for the brazing composition is not necessary and the composition is held firmly in place on the substrate by the binder.

For carrying out the brazing, the surfaces being joined and the preform are typically heated to a temperature in the range of about 500°–650° C.

BRIEF DESCRIPTION OF THE DRAWINGS

In the drawings which illustrate certain preferred embodiments of this invention.

DESCRIPTION OF THE PREFERRED EMBODIMENTS

Figure 1:
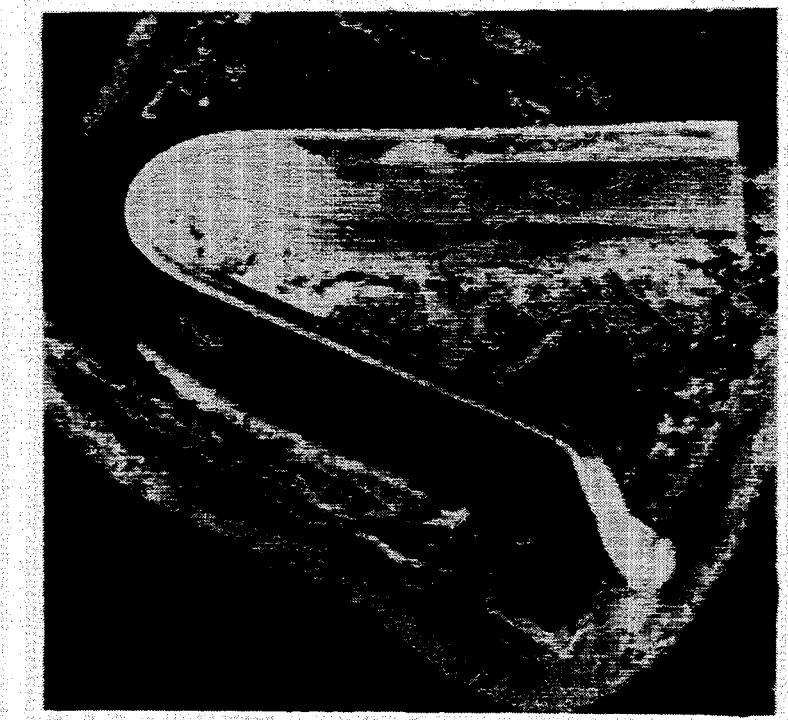
FIG. 1 is a photograph of a brazed joint using a foil laminate containing Si and flux according to the invention.

By way of further illustration of the invention, reference may be had to the following specific examples:

Example 1

A consumable cored wire was prepared according to the present invention using 0.004 in. (0.102 mm) thick AA1100 aluminum alloy foil for the encapsulating outer layer, with a core consisting of a particle mixture of silicon and Nocolok ® flux. These were used in a ratio of silicon:flux of 1:2. The silicon had a particle size distribution in the range of 50–100 μm.

This consumable cored wire was used to make a tube-to-manifold joint in an automotive air conditioner evaporator assembly, the brazing being carried out by heating with a hand held air-acetylene torch. The tube being joined to the manifold was extruded from AA3003 aluminum alloy and the joining gap was 0.005 in. (0.127 mm). These materials being joined were supplied by a commercial heat exchanger manufacturer and represent current commercial practice for brazing with brazing alloy solid wire preforms.

It was found that when brazing with the consumable cored wire of the present invention, the filler metal formation and flow were excellent. The molten flux easily moved over the mating surfaces, dissolving the natural oxide, and allowing the eutectic metal formed in situ to flow over the entire joint area. There was sufficient filler metal generated to form generous fillets on the air side and the fluid side of the joint.

Example 2

A laminated structure in the form of a shim was prepared using two sheets of AA1100 aluminum alloy foil, each of thickness 0.004 in (0.102 mm), and depositing an intercalated layer of Si/flux powder. Intercalation was achieved by squeezing a water-based slurry of Si/flux through a #50 silk screen (mesh opening=355 μm, thread diameter=160 μm) onto one foil surface, covering the coated layer with the second foil and rolling the composite material. The aqueous slurry contained 62 wt % solids, with a Si:flux weight ratio of 1:2, and yielded coating weight of 174 g m$^{-2}$.

Rolling was carried out in two steps. In the first step, the laminated structure was heated to 300° C. between two aluminum plates and was then immediately rolled. The aluminum plates were used to increase thermal mass and hence minimize foil cooling during contact with the unheated rolls. Hot-rolling was used to generate mechanical interlocking between the Si/flux layer and the internal foil surfaces, and did not yield a significant foil gauge reduction. In the rolling procedure, a parting powder-layer was introduced between the foil surfaces and the aluminum plates to mitigate bonding during rolling. In a second step, the laminate was subjected to one cold-roll pass with a reduction of 50% to increase interfoil adhesion and reduce shim gauge. The final shim was approximately 0.004 in (0.102 mm) in thickness.

Figure 2:
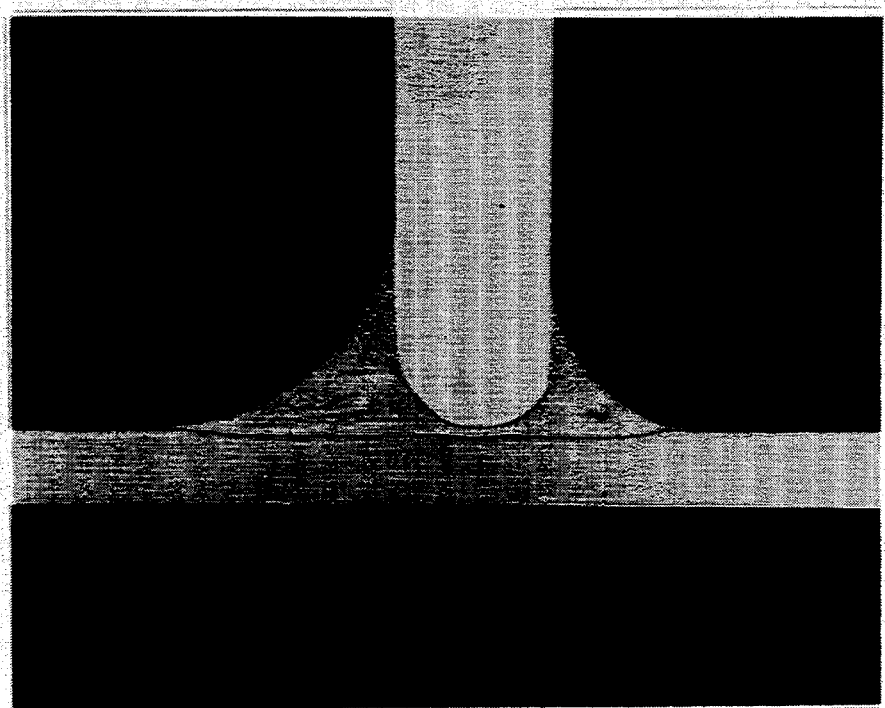
FIG. 2 is a micrograph of a joint of FIG. 1 in cross section.

All brazing using the shim was carried out in a nitrogen atmosphere by heating the joint at a temperature of 600° to 605° C. for approximately 1 minute. The following joints were produced:

(a) A strip of AA1100 aluminum alloy sheet was connected perpendicularly to a copper sheet by placing one of the above consumable laminates between the parts to be joined. The joining area was then heated to brazing temperature and the filler metal formation and flow were found to be excellent. The brazed assembly is shown in FIG. 1 and a micrograph of the connection cross section is shown in FIG. 2.

Figure 3:
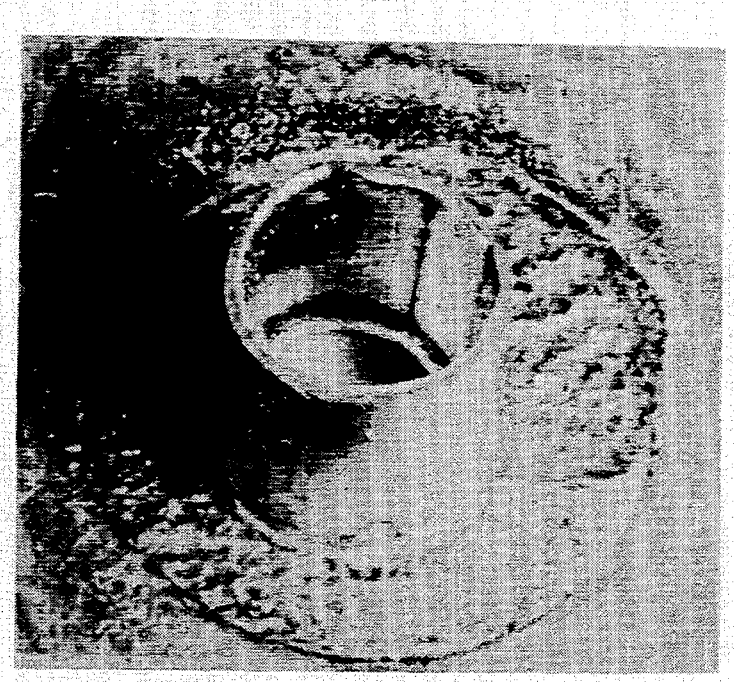
FIG. 3 is a photograph of a further brazed joint between a tube and a sheet according to the invention.
Figure 4:
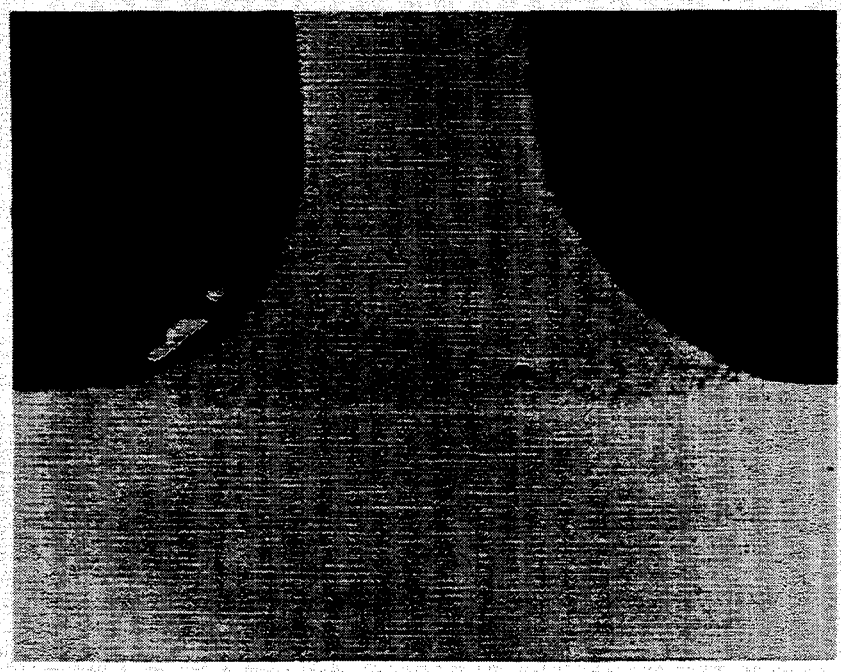
FIG. 4 is a micrograph of a joint of FIG. 3 in cross section.

(b) Following the same general procedure as described in part (a) an AA3003 aluminum alloy tube as joined to an AA1100 aluminum alloy sheet. Thus, a consumable laminate was placed between the tube end and sheet being joined and the assembly was then heated to brazing temperature. Again, the filler metal formation and flow were excellent. The brazed assembly is shown in FIG. 3 and a cross section of the brazed connection is shown in FIG. 4.

(c) Again following the same general procedure as in part (a) two pieces of AA3003 aluminum alloy tubing were joined axially. For this application, a ring of appropriate dimension was first cut out of a shim using a punch tool and this ring was then located between the machined ends of the tubes to be joined. Brazing was carried out while the tubes were held together mechanically and once again an excellent brazed connection was obtained.

Example 3

Following the same general procedure as in Example 1 a consumable cored brazing wire was produced with a core formed of a germanium powder and Nocolok® flux. The proportion by weight of germanium:flux was 0.5:1 and formulation was such that the combination of germanium and aluminum resulted in a nominal composition of filler alloy of 30% germanium/70% aluminum.

This consumable cored wire was used to join two aluminum tubes end-to-end. The tubes consisted of extrusions of AA3003 aluminum alloy. The first tube had a uniformly flared section with a inner diameter larger than the outer diameter of the second tube. The second tube was fitted into the flared portion of the first tube, then a preform of the germanium-cored wire was cut and wrapped around the joint area. The brazing was conducted in air using an acetylene torch.

Figure 5:
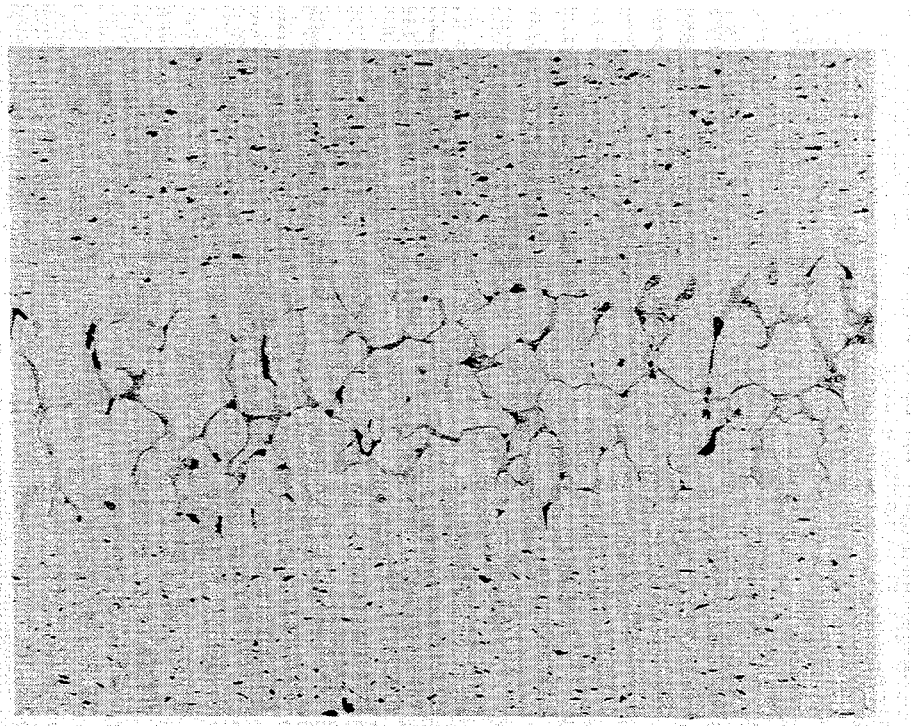
FIG. 5 is a micrograph of a further brazed joint according to the invention.

FIG. 5 is a micrograph showing a portion of the joint and this shows complete incorporation of the germanium metal powder into the filler metal generated in situ. Both the generation and flow of the filler was very uniform. Erosion of the base metal is also uniform. A sound, leak-free metallurgical bond was achieved.

What is claimed is:

1. A consumable brazing encapsulate for use in joining aluminum to metal surfaces, said encapsulate comprising a mixture of particles of an eutectic forming metal selected from the group consisting of silicon, germanium, copper and zinc and particles of a brazing flux encapsulated in a layer or layers of aluminum or its alloys, said eutectic forming metal and flux being present in the following parts by weight per 100 parts by weight of the total aluminum in the encapsulate:
    (a) 7 to 15 parts of silicon and 7 to 45 parts of flux;
    (b) 25 to 120 parts of germanium and 100 to 250 parts of flux;
    (c) 40 to 70 parts of copper and 20 to 100 parts of flux;
    (d) 1300 to 2400 parts of zinc and 70 to 200 parts of flux;
such that when the encapsulate is placed between aluminum surfaces to be joined and is heated, the eutectic forming metal and the encapsulating aluminum are totally converted in situ into an eutectic filler metal for joining the aluminum surfaces.

2. An encapsulate according to claim 1 wherein the encapsulated mixture includes aluminum powder.

3. An encapsulate according to claim 1 wherein the encapsulated mixture comprises a mixture of flux particles and particles of one or more hypereutectic alloys selected from the group consisting of Al-Si, Al-Ge, Al-Cu and Al-Zn.

4. An encapsulate according to claim 3 wherein the encapsulated mixture also includes aluminum powder.

5. An encapsulate according to claim 1 wherein the encapsulated mixture comprises a mixture of particles of one or more aluminum alloys, particles of one ore more of silicon germanium, copper and zinc or particles of one or more hypereutectic alloys selected from Al-Si, Al-Ge, Al-Cu and Al-Zn and particles of flux.

6. An encapsulate according to claim 5 wherein the aluminum alloy particles are alloys containing alloying amounts of one or more of Cu, Mn, Zn, Fe and Si.

7. An encapsulate according to claim 1 wherein the flux is a potassium fluoroaluminate brazing flux which melts below 600° C. and which in molten state is adapted to remove oxide film from aluminum surfaces.

8. An encapsulate according to claim 1 wherein the flux is present in an amount sufficient to remove oxide film from the encapsulating aluminum surface adjacent the eutectic forming metal and to remove oxide film from aluminum surfaces being joined by the brazing encapsulate.

9. An encapsulate according to claim 8 wherein the mixture of particles also includes a binder capable of volatilizing at a temperature below the melting point of the flux and the eutectic alloy.

10. An encapsulate according to claim 8 wherein the brazing flux has an elemental composition by weight of: 20 to 45% K; 10 to 25% Al and 45 to 60% F.

11. An encapsulate according to claim 8 wherein the brazing flux has a composition, expressed in terms of the weight of the equivalent simplest compounds of 40 to 70% $AlF_3$ and 30 to 60% KF.

12. An encapsulate according to claim 8 wherein the mixture of particles additionally contains at least one other particulate material for modifying the nature of the brazing joint, said at least one other particulate material being at least one metal selected from the group consisting of Be, Cu, Fe, Mn, Ni, Zn, Bi, Sr, Cr, Sb and V.

13. An encapsulate according to claim 8 in the form of a hollow aluminum wire with said mixture of particles forming a central core therein.

14. An encapsulate according to claim 8 comprising a sandwich structure with said mixture of particles held between aluminum cover sheets.

15. An encapsulate according to claim 8 comprising a hollow extrusion with aluminum surrounding said mixture of particles.

16. An encapsulate according to claim 8 wherein the particles of eutectic forming metal have sizes in the range of 4 to 150 μm.

17. An encapsulate according to claim 16 wherein the particles of eutectic forming metal have sizes in the range of 4 to 100 μm.

18. An encapsulate according to claim 16 wherein the particles of eutectic forming metal have sizes in the range of 50 to 100 μm.

19. An encapsulate according to claim 16 wherein the aluminum forming the layer or layers comprises commercially pure aluminum or a ductile aluminum alloy.

20. A consumable brazing laminate for use in joining aluminum to metal surfaces, said laminate comprising an aluminum or aluminum alloy substrate having bonded thereto a mixture of particles of an eutectic forming metal selected from the group consisting of silicon, germanium, copper and zinc and particles of a brazing flux, said eutectic forming metal and flux being present in the following parts by weight per 100 parts by weight of the total aluminum in the laminate:
(a) 7 to 15 parts of silicon and 7 to 45 parts of flux;
(b) 25 to 120 parts of germanium and 100 to 250 parts of flux;
(c) 40 to 70 parts of copper and 20 to 100 parts of flux;
(d) 1300 to 2400 parts of zinc and 70 to 200 parts of flux;
such that when the laminate is placed between aluminum surfaces to be joined and is heated, the eutectic forming metal and the aluminum substrate are totally converted in situ into an eutectic filler metal for joining the aluminum surfaces.

21. A laminate according to claim 20 wherein the particles are bonded by a binder capable of volatilizing at a temperature below the melting point of the flux and the eutectic alloy.

22. A laminate according to claim 21 wherein the particle mixture includes aluminum powder.

23. A laminate according to claim 21 wherein the particle mixture comprises a mixture of flux particles and particles of one or more hypereutectic alloys selected from the group consisting of Al-Si, Al-Ge, Al-Cu and Al-Zn.

24. A laminate according to claim 23 wherein the particle mixture also includes aluminum powder.

25. A laminate according to claim 21 wherein the particle mixture comprises a mixture of particles of one or more aluminum alloys, particles of one ore more of silicon germanium, copper and zinc or particles of one or more hypereutectic alloys selected from Al-Si, Al-Ge, Al-Cu and Al-Zn and particles of flux.

26. A laminate according to claim 25 wherein the aluminum alloy particles are alloys containing alloying amounts of one or more of Cu, Mn, Zn, Fe and Si.

27. A laminate according to claim 21 wherein the flux is a potassium fluoroaluminate brazing flux which melts below 600° C. and which in molten state is adapted to remove oxide film from aluminum surfaces.

28. A laminate according to claim 21 wherein the flux is present in an amount sufficient to remove oxide film from the encapsulating aluminum surface adjacent the eutectic forming metal and to remove oxide film from aluminum surfaces being joined by the brazing encapsulate.

29. A laminate according to claim 28 wherein the brazing flux has an elemental composition by weight of: 20 to 45% K; 10 to 25% Al and 45 to 60% F.

30. A laminate according to claim 28 wherein the brazing flux has a composition, expressed in terms of the weight of the equivalent simplest compounds of 40 to 70% $AlF_3$ and 30 to 60% KF.

31. A laminate according to claim 28 wherein the mixture of particles additionally contains at least one other particulate material for modifying the nature of the brazing joint, said at least one other particulate material being at least one metal selected from the group consisting of Be, Cu, Fe, Mn, Ni, Zn, Bi, Sr, Cr, Sb and V.

* * * * *